United States Patent

Schroeter

[15] 3,673,216

[45] June 27, 1972

[54] ALKOXYOXETANES

[72] Inventor: Siegfried H. Schroeter, Schenectady, N.Y.

[73] Assignee: General Electric Company

[22] Filed: May 1, 1970

[21] Appl. No.: 33,904

Related U.S. Application Data

[63] Continuation-in-part of Ser. No. 671,576, Sept. 29, 1967, abandoned.

[52] U.S. Cl.....................260/333, 260/2 XA, 260/77.5 AP, 260/611 A, 260/615 A, 204/158 R
[51] Int. Cl..........................................................C07d 3/00
[58] Field of Search....................................................260/333

[56] References Cited

UNITED STATES PATENTS

| | | | |
|---|---|---|---|
| 3,040,058 | 6/1962 | England | 260/333 |
| 3,164,610 | 1/1965 | Davis | 260/333 |
| 3,400,135 | 9/1968 | Polak et al. | 260/333 |
| 3,417,102 | 12/1968 | Braun | 260/333 |
| 3,446,819 | 5/1969 | Ardis et al. | 260/333 |

OTHER PUBLICATIONS

Janculev et al., Chem. Ber. 100, 715– 719 (1967)
Nerdel et al., Chem. Ber. 101, 1850– 1862 (1968)

*Primary Examiner*—Norma S. Milestone
*Attorney*—Richard R. Brainard, Paul A. Frank, Joseph T. Cohen, Charles T. Watts, William A. Teoli, Frank L. Neuhauser, Oscar B. Waddell and Joseph B. Forman

[57] ABSTRACT

2-Alkoxyoxetanes are produced by the reaction of an aldehyde or ketone with a vinyl ether in the presence of ultraviolet light. The 2-alkoxyoxetanes produced in accordance with this invention are useful as plasticizers for organic resins, as intermediates for making 3-hydroxy-alkyl ethers utilizing an appropriate Grignard reagent, and 3-hydroxy substituted acetals by reaction with alcohols, and as monomers for polymerization to polyoxyalkylene compounds employing, for example, trialkyl aluminum compounds with water in accordance with known processes.

4 Claims, No Drawings

ALKOXYOXETANES

This is a continuation-in-part of my copending application, Ser. No. 671,576, filed Sept. 29, 1967 and now abandoned, and assigned to the same assignee as the present invention.

In accordance with the process of the present invention, alkoxyoxetanes can be produced in good yields by irradiating with ultraviolet light, a mixture of a vinyl ether of the formula, (1) 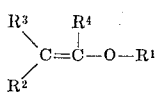

with a carbonyl compound of the formula, (2) 

or a cycloaliphatic carbonyl compound of the formula, (3) $C_nH_{2n-2}=O$ where R is a hydrocarbon radical having from one to 18 carbon atoms selected from alkyl radicals and aryl radicals, $R^1$ is a monovalent hydrocarbon radical, $R^2$, $R^3$ and $R^4$ are hydrogen or an $R^1$ group and $R^5$ is hydrogen or an R group and n is an integer of from 4 to 18, where the ultraviolet light has a wavelength of from 2,000 to 3,700 Angstroms.

The process of this invention is more readily illustrated by the following equation which for simplicity shows the reaction of acetone with vinyl ethyl ether:

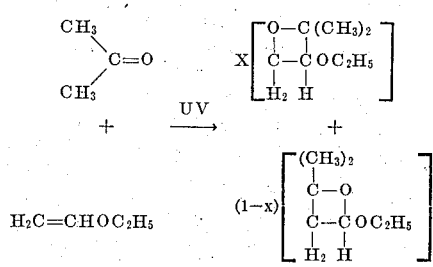

where $x$ is a fraction. As can be seen from the equation, 1 mole of the acetone reacts with 1 mole of the vinyl ethyl ether to yield a total of 1 mole of the isomeric oxetanes.

The ratio of the aldehyde or ketone to the vinyl ether employed in the process of this invention is not narrowly critical and can range from as little as 1 to 100 parts, by weight, of the aldehyde or ketone to 100 to 1 part, by weight, of the vinyl ether.

A solvent is not necessary in conducting the process of this invention; either the carbonyl compound or the vinyl ether may serve as a solvent. However, a solvent can be employed if desired. If one employs a solvent in the process of this invention, one can employ on a weight basis, from 1 to 1000 parts of the solvent, per 100 parts of the reactants. The solvents other than the reactants, which are useful in conducting the process of this invention are those liquids in which the reactants and the reaction products are soluble and which do not absorb ultraviolet light in the region where the carbonyl reagent absorbs ultraviolet light and which are not affected by ultraviolet light. Such solvents will vary with the nature of the carbonyl compound used. Examples of such solvents are pentane, hexane, benzene, diethyl ether, dibutyl ether, acetonitrile, tetrahydrofuran, N,N-dimethylformamide, etc.

The temperature at which the process of this invention is conducted is not critical. Temperatures from as low as −60° C to as high as 200° C or more can be employed in the process of this invention. It is preferred, however, to conduct the process at ambient temperatures, that is, at temperatures from 10° to 50° C for simplicity of equipment and operation of the process.

The process of the present invention can be conducted at subatmospheric, atmospheric or superatmospheric pressures. It is preferred, for simplicity and ease of operation, to conduct the process at atmospheric pressure and in the liquid phase.

The monovalent hydrocarbon radicals which $R^1$, $R^2$, $R^3$ and $R^4$ represent include alkyl radicals such as methyl, ethyl, isopropyl, tert-butyl, etc.; alkenyl radicals such as vinyl, crotyl, allyl, methallyl, decenyl, octadecenyl, etc.; cycloalkyl radicals such as cyclopentyl, cyclohexyl, etc.; cycloalkenyl radicals such as cyclopentenyl, cyclohexenyl, cycloheptenyl, etc.; aryl radicals such as phenyl, xenyl, naphthyl, etc.; aralkyl radicals such as benzyl, phenylethyl, phenylpropyl, etc.; alkaryl radicals such as tolyl, xylyl, etc.

Illustrative of the vinyl ethers of formula (1) which can be employed in the process of this invention are, for example, vinyl methyl ether, vinyl ethyl ether, vinyl isopropyl ether, vinyl butyl ether, vinyl phenyl ether, α-phenylvinyl methyl ether, β-phenylvinyl methyl ether, β-methylvinyl ethyl ether, β-methylvinyl naphthyl ether, vinyl tolyl ether, etc.

Illustrative of alkyl groups which R and $R^5$ represent are, for example, methyl, ethyl, isopropyl, t-butyl, decyl, undecyl, octadecyl, and the like. Illustrative of the aryl groups which R and $R^5$ represent are, for example, phenyl, naphthyl, xenyl, tolyl, xylyl, etc.

The carbonyl compounds of formula (2) which are employed in the process of this invention include ketones and aldehydes. Illustrative of the ketones which can be employed in the process of this invention are, for example, the aliphatic ketones such as acetone, methyl ethyl ketone, diethyl ketone, dipropyl ketone, diisopropyl ketone, diisobutyl ketone, butyl ethyl ketone, etc.; the cyclo ketones of formula (3), for example, cyclobutanone, cyclopentanone, cyclohexanone, Illustrative of the aldehydes which can be employed in the process of this invention are, for example, acetaldehyde, propionaldehyde, butyraldehyde, octadecaldehyde, benzaldehyde, etc.

The 2-alkoxyoxetanes produced in accordance with the process of this invention are those having the formulas, (4) 

and (5) 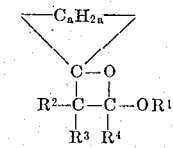

wherein R, $R^1$, $R^2$, $R^3$, $R^4$ and $R^5$ are as above defined, and $a$ is an integer equal to 3 to 17 inclusive.

Illustrative of the oxetanes which are included in formulas (4) and (5) are, for example, 4,4-dimethyl-2-methoxyoxetane; 4,4-(p-bromo)phenyl-2-n-butoxyoxetane; 4-methyl-4-ethyl-2-propxyoxetane; 4,4-diethyl-3,3-dimethyl-2-n-butoxyoxetane; 4,4-diphenyl-2-ethoxyoxetane; 2-methoxy-1-oxaspiro[3.5]nonane; 3-(p-chloro)phenyl-2-ethoxy-1-oxaspiro[3.5]nonane; 2-methoxy-1-oxaspiro[3.7]undecane; 2,3,3-trimethyl-2-methoxy-1-oxaspiro[3.11]pentadecane, etc.

The 2-alkoxyoxetanes produced in accordance with the process of this invention are useful as starting materials in the preparation of polymers containing the polytrimethylene oxide unit. For instance, they may be polymerized by Friedel-Crafts catalysts, for example, in accordance with the procedures described in U.S. Pat. No. 2,905,647, issued Sept. 22, 1959 and U.S. Pat. No. 2,722,520, issued Nov. 1, 1955, or by trialkylaluminum catalysts, for example, as described in U.S. Pat. No. 2,895,921 and 2,895,922, issued July 21, 1959. The oxetanes produced by the process of this invention can also be copolymerized with other oxetanes.

The high molecular weight polyoxetanes can then be compounded with fillers and curing agents such as peroxide and the like and cured to elastomers which are useful as gaskets, elastic hoses, electrical insulators, etc.

The 2-alkoxyoxetanes produced in accordance with this invention can also be homo- or copolymerized with other oxetanes and hydroxyl-containing materials employing an acid catalyst such as sulfuric acid to yield hydroxyl-terminated polymers which are useful in producing polyurethanes by the reaction with tolylene diisocyanate according to known processes.

The following examples serve to further illustrate the invention. All parts are by weight unless otherwise expressly set forth.

EXAMPLE 1

Acetone (125 ml) and vinyl ethyl ether (100 g) were placed in a reaction flask under a blanket of nitrogen and irradiated with an internally water-cooled quartz reactor with a 450 W medium pressure mercury lamp surrounded by a Vycor 7910 glass filter for 24 hours. Unreacted starting material was recovered by distillation through a short Vigreaux column at atmospheric pressure (b.p. 50°–65° C) and the residue was distilled in vacuo to yield 51.0 g of a mixture of alkoxyoxetanes, b.p. 60°–80° C/70 mm. Nuclear magnetic resonance analysis indicated this to be a 70:30 mixture of the 3- and 2-ethoxyoxetane.

The mixture was distilled through a spinning band column. There was obtained 9 g of 4,4-dimethyl-2-ethoxy-oxetane of the following structure,

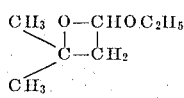

It had a b.p. 54°/62 mm, $n_D^{20}$ = 1.4002. It was shown to be free of its 3-isomer by VPC and NMR analyses. The material analyzed as follows:

| | | |
|---|---|---|
| Found: | C, 64.74; | H, 10.74. |
| Calculated: | C, 64.58; | H, 10.84. |

The above 2-alkoxyoxetane is used to make a 3-hydroxyalkyl ether by the following procedure:

A portion of the above mixture is dissolved in diethyl ether and added to an excess of phenyl magnesium bromide. The resulting mixture is refluxed for 30 minutes at about 38° C. The mixture is then cooled and poured into an HCl-ice mixture to decompose the excess phenyl magnesium bromide. The ethereal layer is distilled after being washed with aqueous sodium bicarbonate and brine and dried over magnesium sulfate. There is obtained a quantitative yield of 1-ethoxy-1-phenyl-2-methyl-2-butanol (b.p. 57° C to 0.05 mm Hg, $n_D^{20}$ 1.4900).

EXAMPLE 2

Acetone (250 ml) and vinyl butyl ether (90 g) were charged into an internally water-cooled quartz reactor under a blanket of nitrogen and were irradiated for 24 hours with the mercury lamp described in Example 1. Unreacted starting material was recovered by distillation at atmospheric pressure through a short Vigreaux column and the residue was distilled in vacuo to yield 71.2 g of isomeric oxetanes, b.p. 60°–80° C/20 mm. Distillation of this mixture on a spinning band column afforded 12 g of the 4,4-dimethyl-2-n-butoxyoxetane of the following structure,

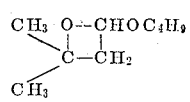

It had b.p. 66° C/18 mm, $n_D^{20}$=1.4125. Elemental analysis showed the following:

| | | |
|---|---|---|
| Found: | C, 68.49; | H, 11.49. |
| Calculated: | C, 68.31; | H, 11.47. |

A portion of the above isomeric oxetane mixture is dissolved in dry n-butanol to produce a mixture in which the oxetane is present at about 30 percent by weight. The mixture is refluxed at 117° C for 3 hours. The alcohol is evaporated off. There is obtained a quantitative yield of 3-methyl-3-hydroxybutyraldehyde di-n-butyl acetal (b.p. 61° C/0.05 mm Hg, $n_D^{20}$=1.4305).

EXAMPLE 3

Cyclohexanone (125 g) and ethyl vinyl ether (250 ml) were placed in the reactor and irradiated as described in Example 1. There was obtained 61 g of isomeric oxetanes which upon fractionation gave 8 g of 2-ethoxy-1-oxaspiro-[3.5]nonane of the following formula,

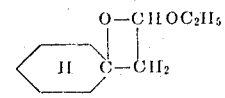

It had a b.p. 56.5°/2.5 mm, $n_D^{20}$=1.4502. The material had the following analysis:

| | | |
|---|---|---|
| Found: | C, 70.50; | H, 10.52. |
| Calculated: | C, 70.54; | H, 10.66. |

EXAMPLE 4

A mixture of cyclohexanone (14.72 g) and n-propyl β,β-dimethylvinyl ether (22.85 g) were irradiated for 20 hours in accordance with the method of Example 1. Volatiles were evaporated in vacuo and the residue was fractionated to yield 17.8 g (42 percent) of 2,2-dimethyl-3-n-propoxy-1-oxaspiro[3.5]bnonane, b.p. 70°/1.7 mm and 13.6 g (32 percent) of 3,3-dimethyl-2-n-propoxy-1-oxaspiro[3.5]nonane; b.p. 68°/1.0 mm of the following formula,

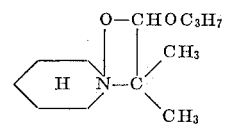

The identity of the 2-alkoxyoxetane was confirmed by elemental analysis:

| | | |
|---|---|---|
| Found: | C, 73.61; | H, 11.40. |
| Calculated: | C, 73.53; | H, 11.39. |

EXAMPLE 5

A mixture of acetone (20 g) and ethyl β,β-diethylvinyl ether (58 g) were irradiated in 250 ml of acetonitrile as described in Example 1. Evaporation of volatiles in vacuo left a residue that was fractionated through a spinning band column to yield 51 g (80 percent) of a mixture of oxetanes, b.p. 72°–85°/27 mm, which consisted of 2,2-dimethyl-4,4-diethyl-3-ethoxyoxetane (15 percent) and of 2-ethoxy-3,3-diethyl-4,4-dimethyloxetane (85 percent) of the formula,

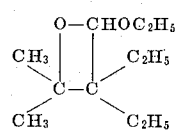

The identity of the 2-ethoxy oxetane was confirmed by elemental analysis as follows:

| | | |
|---|---|---|
| Found: | C, 71.1; | H, 12.0. |
| Calculated: | C, 70.9; | H, 11.9. |

EXAMPLE 6

A solution of benzophenone (9.11 g) and n-propyl-β,β-dimethylvinyl ether (17.1 g) in 150 ml of benzene and 150 ml of acetonitrile was irradiated through a Pyrex filter for 20 hours. The mixture was then stripped of volatiles. There was recovered a mixture of oxetanes by preparative VPC having a major amount of 2-n-propoxy-3,3-dimethyl-4,4-diphenyl oxetane of the formula,

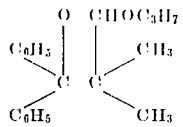

The identity of the product was confirmed by its IR and NMR spectra and elemental analysis as follows:

| | | |
|---|---|---|
| Found: | C, 81.04; | H, 8.16. |
| Calculated: | C, 81.18; | H, 8.16. |

EXAMPLE 7

A solution of acetophenone (12.0 g) and methyl β,β-diethylvinyl ether (18.0 g) in 200 ml of benzene was irradiated for 70 hours through a Pyrex filter. A mixture of oxetanes was separated from the reaction product by preparative VPC. The mixture was found to consist of cis- and trans-isomers of 2- and 3-methoxy oxetanes. About 90 percent by weight of the oxetane mixture consisted of cis- and trans-isomers of 3,3-diethyl-4-methyl-4-phenyl-2-methoxy-oxetanes of the formula,

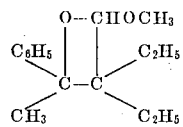

The identity of the isomers were further established by their infrared and NMR spectra and elemental analysis as follows:

| | | |
|---|---|---|
| Found: | C, 76.7; | H, 9.4. |
| Calculated: | C, 76.9; | H, 9.5. |

It will, of course, be apparent to those skilled in the art that modification other than those set forth in the above examples can be employed in the process of this invention, without departing from the scope thereof.

I claim:

1. An alkoxyoxetane selected from,

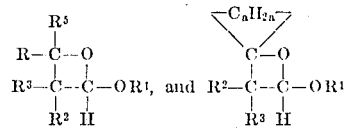

where R is a hydrocarbon radical having from one to 18 carbon atoms selected from alkyl radicals and aryl radicals, $R^1$ is a monovalent hydrocarbon radical, $R^2$ and $R^3$ are selected from alkyl radicals, and $R^5$ is selected from R radicals, and $a$ is an integer equal to from 3 to 17 inclusive.

2. 3,3-diethyl-4-methyl-4-phenyl-2-methoxy oxetane.
3. 2-ethoxy-3,3-diethyl-4,4-dimethyloxetane.
4. 2-n-propoxy-3,3-dimethyl-4,4-diphenyloxetane.

* * * * *